United States Patent [19]

Engblom

[11] Patent Number: 5,771,023
[45] Date of Patent: Jun. 23, 1998

[54] BROAD BAND HELICAL ANTENNA

[75] Inventor: Gunnar Engblom, Åkersberga, Sweden

[73] Assignee: Allgon AB, Akersberga, Sweden

[21] Appl. No.: 637,743

[22] PCT Filed: Oct. 26, 1994

[86] PCT No.: PCT/SE94/01008

§ 371 Date: Apr. 26, 1996

§ 102(e) Date: Apr. 26, 1996

[87] PCT Pub. No.: WO95/12224

PCT Pub. Date: May 4, 1995

[30] Foreign Application Priority Data

Oct. 29, 1993 [SE] Sweden .................................. 9303570

[51] Int. Cl.[6] ........................................................ H01Q 1/24
[52] U.S. Cl. ........................... 343/702; 343/895; 343/900
[58] Field of Search ................................... 343/702, 895, 343/900, 901; H01Q 1/24

[56] References Cited

U.S. PATENT DOCUMENTS

| | | | |
|---|---|---|---|
| 2,755,469 | 7/1956 | Etheridge | 343/895 |
| 4,121,218 | 10/1978 | Irwin et al. | 343/702 |
| 4,772,895 | 9/1988 | Garay et al. | 343/895 |
| 4,868,576 | 9/1989 | Johnson, Jr. | 343/702 |
| 5,204,687 | 4/1993 | Elliott et al. | 343/702 |
| 5,446,469 | 8/1995 | Makino | 343/702 |
| 5,469,177 | 11/1995 | Rush et al. | 343/895 |
| 5,479,178 | 12/1995 | Ha | 343/702 |
| 5,504,494 | 4/1996 | Chatzipetros et al. | 343/895 |
| 5,594,457 | 1/1997 | Wingo | 434/895 |

OTHER PUBLICATIONS

Derwent's Abstract, No. 93-366142/46, Week 9346, Abstract of SU, 1758726, Aug. 30, 1992.

*Primary Examiner*—Donald T. Hajec
*Assistant Examiner*—Tan Ho
*Attorney, Agent, or Firm*—Jacobson, Price, Holman & Stern, PLLC

[57] ABSTRACT

The invention relates to a broadband antenna having a first and a second helical antenna (203, 207) wherein the antennas (203, 207) have different resonance frequencies. An antenna which has essentially a larger bandwidth than the bandwidth of an individual helical antenna is formed in coaction between the helical antennas (203, 207), by arranging the antennas coaxially and in generally the same axial positions, wherein the helical antennas (203, 207) are separated galvanically, possibly with the exception of at respective supply points. When fitted to portable equipment, the helical antennas (203, 207) can be combined with an axially movable straight wire antenna.

15 Claims, 2 Drawing Sheets

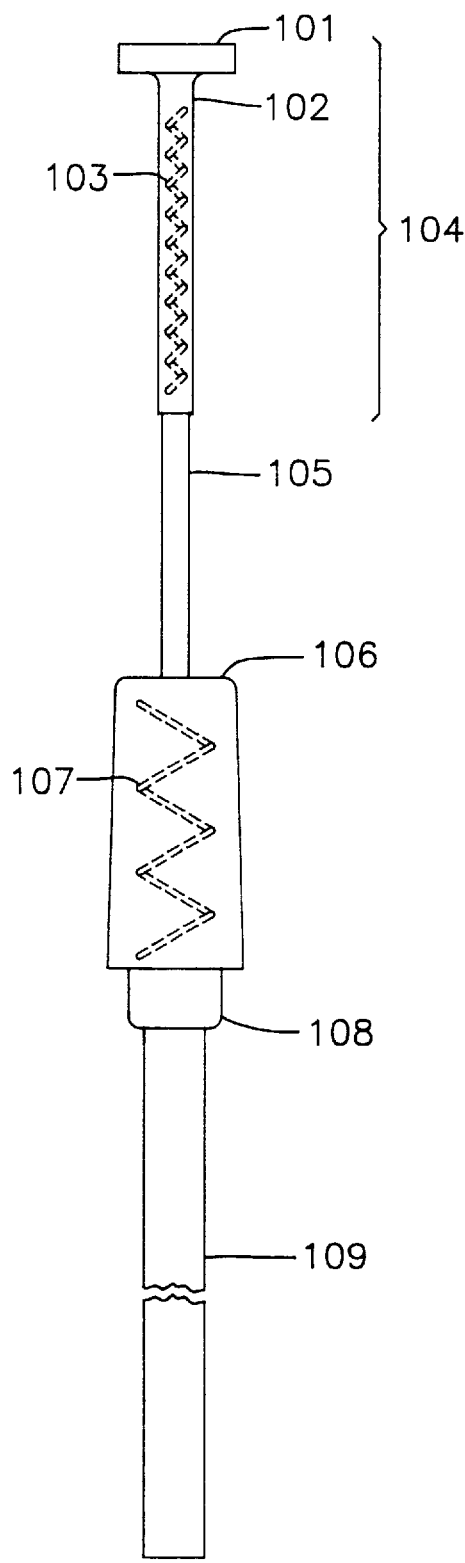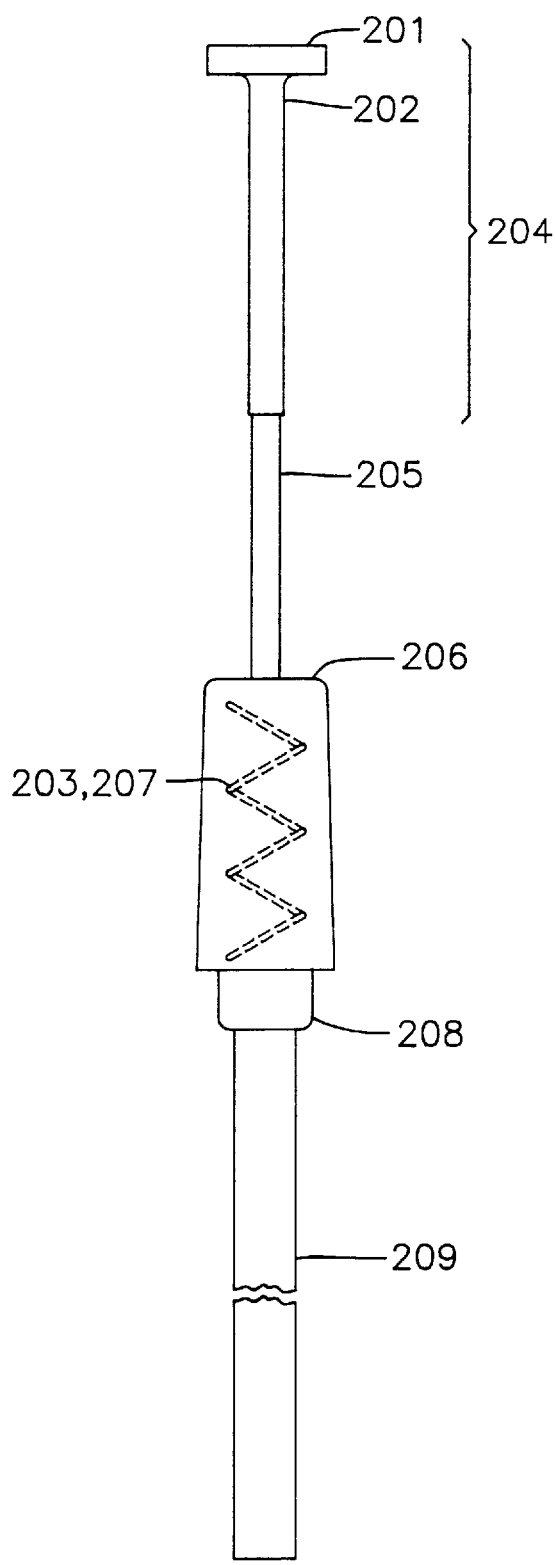

BROAD BAND HELICAL ANTENNA

BACKGROUND OF THE INVENTION

The present invention relates to a broadband antenna means for casing-carried equipment.

Portable equipment, and then particularly hand-carried telephones, are often provided with helical antennas. Such antennas are convenient because they can be made more robust and take up less space than straight wire antennas for instance. However, they do not always give satisfactory antenna performance.

One problem is that a helical antenna is short and can therefore easily be screened or obstructed by a user or by objects in its vicinity. The helical antenna is therefore often combined with an extendable straight wire antenna, which is not screened as easily and which also gives better antenna performance. For instance, the Patent Specifications U.S. Pat. No. 4,121,218, U.S. Pat. No. 5,204,687 and U.S. Pat. No. 4,868,576 describe different antenna means for portable equipment in which a helical antenna has been combined with an extendable straight wire antenna.

Another problem encountered with the use of helical antennas resides in their limited bandwidth. This renders conventional helical antennas unusable in those cases when an antenna function having a very broad band is required, for instance in the JDC mobile telephone system. In cases such as these, it would be desirable to provide an antenna means which has the positive properties of helical antennas coupled with a bandwidth which is much greater than the bandwidth of a conventional helical antenna.

It is, of course, conceivable to provide portable equipment with two separate helical antennas which have mutually different resonance frequencies. Such an antenna arrangement would be unnecessarily space consuming, however.

The problems concerning bandwidth and space requirements are solved by a broadband antenna means according to the present invention. There is thus obtained a helical structure that is resonant at two frequencies which result from the different lengths of respective coils and whose difference is due to the difference in the lengths of the coils.

SUMMARY OF THE INVENTION

The problems relating to screening of the short helical antennas is solved by combining the helical antennas with a straight wire antenna.

Further advantageous embodiments of the invention are defined in the depending Claims. For instance, a helical structure which is resonant at more than two frequencies can also be obtained in a similar manner, by combining three or more coils.

It may also be problematic and require very high precision in manufacture to achieve a well-defined mutual capacitance/inductance between the coils when they are mounted close to one another. This can be alleviated by twisting the coils together prior to being wound to their final helical shape, for instance.

BRIEF DESCRIPTION OF THE DRAWINGS

Two preferred embodiments of the invention will now be described in more detail with reference to the accompanying drawings, in which FIG. 1 is view of a first embodiment of the invention which includes, among other things, a first helical antenna incorporated in a sleeve provided with an attachment means, a second helical antenna, an antenna rod or pin which encloses a straight wire antenna and the second helical antenna;

FIG. 2a illustrates a second embodiment of the invention which includes, among other things, a first helical antenna and a second helical antenna embodied in a sleeve provided with an attachment means, and an antenna rod or pin which embraces a straight wire antenna;

FIG. 2b shows elements of the second embodiment illustrated in FIG. 2a;

DESCRIPTION OF THE PREFERRED EMBODIMENTS

Figure 2B:
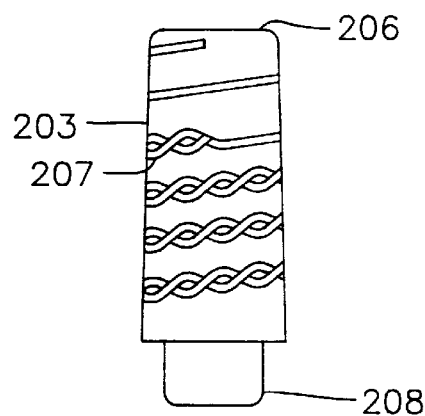

The antenna means illustrated in FIG. 1 is comprised of three main components. Firstly, a first helical antenna which comprises a first coil 107 is embodied coaxially in a hollow, generally cylindrical insulating sleeve 106 made of plastic material or some equivalent material. One end of the coil 107 is connected to a conductive sleeve 108, which is fastened in one end of the insulating sleeve 106. The conductive sleeve 108 is effective in connecting the coil 107 electrically to portable equipment, for instance a hand-carried telephone (not shown), and forms the means for attaching the antenna means externally to the portable equipment.

Secondly, a second helical antenna which is comprised of a second coil 103 whose length is different to, and preferably shorter than the length of the first coil 107, and thirdly a straight wire antenna 105. The second coil 103 is arranged coaxially in an insulated upper part 104 of an antenna rod or pin 102 which is provided with a knob 101 on top of the pin. The lower part of the antenna pin includes the straight wire antenna 105, and the whole of the antenna pin 102 can be inserted and extended axially through the insulating sleeve 106, the first coil 107 and the conductive sleeve 108.

Attached to the other end of the insulating sleeve 106 is an insulating tube 109 which when fitted in place is located within the portable equipment and in which the antenna pin 102 is located in when in its inserted or retracted position. Axial movement of the antenna pin is preferably limited by the knob 101 and also by a shoulder or abutment (not shown) on the lower end of the antenna pin 102.

When the antenna pin 102 is telescoped to its inwardly inserted position, the straight wire antenna will lie generally beneath the conductive sleeve 108 and is essentially inactive. The two coils 107, 103 are located coaxially with one another in generally the same axial position. The coils are therewith mutually coupled capacitively/inductively, as shown in the circuit diagram of FIG. 3. The result is an antenna function which has a much broader band than the antenna function of each coil 107, 103 when taken individually.

In the outwardly extended position of the antenna pin 102, the straight wire antenna 105 will be positioned substantially above the conductive sleeve 108, wherein the straight wire antenna 105 is connected to the portable equipment either directly or via the first coil 107 and forms the main antenna function.

The helical antennas and the straight wire antenna 105 can be connected electrically to circuits in the portable equipment galvanically and/or capacitively/inductively in a combined form, wherein switching between different combinations is effected by extending or inserting the antenna pin 102. Switch means intended for this purpose may conceivably be provided in the proximity of the conductive sleeve 108, wherein the switch means preferably coactable with parts of the antennas 103, 105 that are located within the antenna pin 102.

The antenna means illustrated in FIG. 2*a* is comprised of two main components. Firstly, a first helical antenna and a second helical antenna which are comprised respectively of a first coil 207 and a second coil 203 which are embodied coaxially in a hollow, generally cylindrical insulating sleeve 206 made of plastic material or some equivalent material. One end of respective coils 207, 203 is connected to a conductive sleeve 208 which is attached to one end of the insulating sleeve 206. The conductive sleeve 208 is operative in connecting the coils 207, 203 electrically to portable equipment, for instance a hand-carried telephone (not shown), and forms the means for attachment of the antenna means externally to the portable equipment. The first coil 207 and the second coil 203 are combined to form commonly a unitary helical form, which will be described in more detail below with reference to FIG. 2*b*.

Secondly, a straight wire antenna 205 is arranged in a lower part of an antenna pin or rod 202. The antenna pin 202 has an insulated upper part 204 and carries a knob 201 at the top thereof. The whole of the antenna pin 202 can be inserted and extended, i.e. telescoped, axially through the insulating sleeve 206, the first coil 207, the second coil 203 and the conductive casing 208.

Attached to the other end of the insulating sleeve 206 is an insulating tube 209 which when fitted in place is located within the portable equipment and in which the antenna pin 202 is located when in its inserted position. Axial movement of the antenna pin is preferably limited by the knob 201 and also by a shoulder or abutment (not shown) at the bottom end of the antenna pin 202.

When the antenna pin 202 is inserted, or retracted, the straight wire antenna will be located generally beneath the conductive sleeve 208 and is essentially inactive. The two coils 207, 203, in whose centers the upper insulating part 204 is located, are herewith active and connected to the portable equipment in accordance with the circuit diagram shown in FIG. 4. The result is an antenna function which has a much broader bandwidth than the antenna function of each coil 207, 203 per se.

When the antenna pin 202 is in its outwardly extended position, the straight wire antenna 205 will be located generally above the conductive sleeve 208 and is connected to the portable equipment, either directly or via the coils 207, 203, and forms the main antenna function.

The helical antennas and the straight wire antenna 205 can be connected to circuits in the portable equipment galvanically and/or capacitively/inductively in a combined form, wherein switching between different combinations is effected by extending and inserting the antenna pin 202 telescopically. In this regard, a switch means may conceivably be provided in the proximity of the conductive sleeve 208, this switch means being capable of coacting with preferably the straight wire antenna 205 located in the antenna pin 202.

FIG. 2*b* shows in detail the insulating sleeve 206, the conductive sleeve 208 and the coils 207, 203 of the two helical antennas. The Figure illustrates a suitable manner of arranging the first coil 207 and the second coil 203 in a common helical form whose diameter is slightly smaller than the diameter of the insulating sleeve 206. In this case, the two coils 207, 203 consist of two insulated wires of mutually different lengths, for instance of the kind normally used in transformers.

The wire forming the first coil 207 and the wire forming the second coil 203 are first twisted together along the full length of the shorter wire. The wires are then wound to the common helical form. Twisting of the wires together results in a well-defined capacitive/inductive connection between the wires. This obviates the need of producing the winding with the same degree of precision as that required when the wires are wound parallel to one another in the common helical form. This greatly facilitates manufacture.

Figure 3:
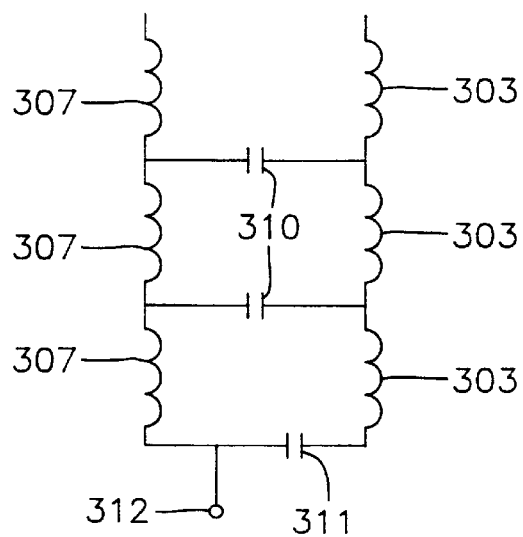
FIG. 3 is a circuit diagram which illustrates an electric function of the helical antennas of the first embodiment illustrated in FIG. 1.

The circuit illustrated diagrammatically in FIG. 3 is an electrical model of the antenna function of the first embodiment when the antenna pin is in its inserted or retracted position, wherein the first and the second coil are described respectively by a first group 307 and a second group 303, each having three series-connected inductances. The capacitance between the first and the second coil is shown with two capacitances 310 connected in parallel at the interconnection points of respective inductances. One end of the first group 307 is parallel connected directly to the circuit 312 in the portable equipment while one end of the second group 303 is parallel connected to the circuit 312 via a capacitance 311.

Figure 4:
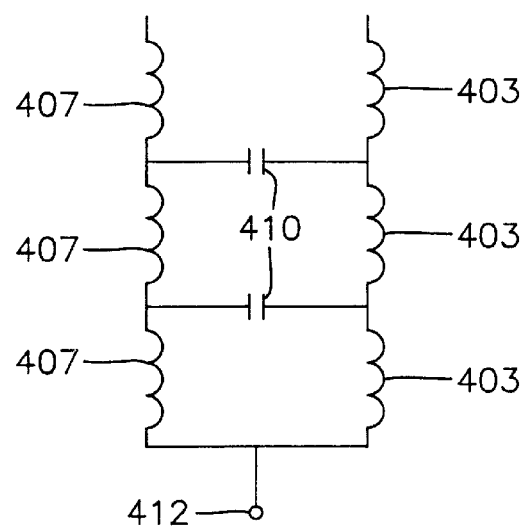
FIG. 4 is a circuit diagram which illustrates an electric function of the helical antennas of the second embodiment shown in FIGS. 2a and 2b.

The circuit illustrated diagrammatically in FIG. 4 is an electrical model of the antenna function of the second embodiment when the antenna pin is in its inserted or retracted position, or alternatively without the antenna pin, wherein the first and the second coil are described respectively by a first group 407 and a second group 403, each having three series-connected inductances. The capacitance between the first and the second coil is shown by two capacitances 410 connected in parallel at the interconnection points of respective inductances. One end of each group 407, 403 is directly parallel-connected to the circuits 412 of the portable equipment.

Figure 5:
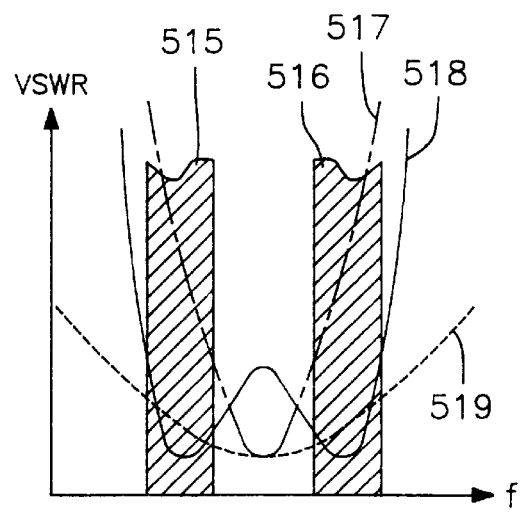
FIG. 5 shows three curves in a bandwidth diagram of a conventional helical antenna of a helical structure according to the invention, and of a straight wire antenna.

The diagram shown in FIG. 5 illustrates the principle configuration of the standing wave ratio as a function of the frequency of different antenna means. A curve 517 which describes a conventional helical antenna has a narrow local minimum, which corresponds to a small bandwidth. A curve 519 which describes a straight wire antenna has a broad local minimum, which corresponds to a large bandwidth. A curve 518 which describes a helical structure according to the invention has two separate local minima located adjacent one another, which corresponds to a large total bandwidth. The marked frequency regions 515, 516 denote transmission and reception bands for a broadband telephone system, for instance JDC. Both of these frequency ranges 515, 516 are included by the bandwidth of the inventive helical structure.

I claim:

1. A broadband antenna means for equipment carried in a case and intended to transmit and/or receive radio signals, said antenna means including a first helical antenna which is comprised of a first coil, and a second helical antenna which is comprised of a second coil, said coils having mutually different lengths which impart to respective helical antennas different resonance frequencies, said first coil and said second coil being conductively separated except for one end of each of the coils and being disposed coaxially so as to form in coaction in essentially the same axial positions an antenna of essentially larger bandwidth than each of the helical antennas per se and being placed adjacent one another so that geometry thereof will generally coincide, with the exception of a section which generally corresponds to a difference between lengths of said coils; wherein an antenna rod is arranged to be axially extendable through the two coaxially arranged coils to reach a first position in which said antenna rod extends outside the case and has a conductive portion which is free from both of the coils, and a second position in which said conductive portion is inserted in the case and is free from said two coils and wherein the conductive portion of the antenna rod and the helical antennas are connectable mutually in a combined form.

2. The antenna means according to claim 1, said first coil and said second coil being twisted together with the exception of the section that corresponds generally to the difference between the lengths of said coils.

3. The antenna means according to claim 1, wherein at least one of said first and said second coils has an insulated outer layer.

4. The antenna means according to claim 1, wherein a first helical antenna supply point and a second helical antenna supply point are mutually connected conductively or capacitively.

5. The antenna means according to claim 4, wherein said supply point of the first helical antenna, said supply point of said second helical antenna and said conductive portion of the antenna rod are mutually connectable conductively or capacitively/inductively in a combined form by axially moving said antenna rod.

6. The antenna means according to claim 1, said second helical antenna being arranged within an upper insulating part of said antenna rod, which also includes said conductive portion and is movable coaxially within said first helical antenna, wherein said second helical antenna is located within said first helical antenna when said antenna rod is in a retracted or inserted position.

7. The antenna means according to claim 6, wherein said second helical antenna is essentially separatable electromagnetically from said first helical antenna by axially moving said antenna rod.

8. The antenna means according to claim 7, wherein a supply point of the first helical antenna, a supply point of the second helical antenna, and said conductive portion of the antenna rod are mutually connectable conductively or capacitively/inductively in a combined form by axially moving said antenna rod.

9. A broadband antenna means for equipment carried in a case and intended to transmit and/or receive radio signals, said antenna means including a first helical antenna which is comprised of a first coil, and a second helical antenna which is comprised of a second coil, said coils having mutually different lengths which impart to respective helical antennas different resonance frequencies, said first coil and, said second coil being conductively separated except for one end of each of the coils and being disposed coaxially so as to form in coaction in essentially the same axial positions an antenna of essentially larger bandwidth than each of the helical antennas per se and being twisted together with the exception of the section that corresponds generally to the difference between the lengths of said coils; wherein an antenna rod is arranged to be axially extendable through at least one of the coaxially arranged coils to reach a first position in which said antenna rod extends outside the case and has a conductive portion which is free from both of the coils, and a second position in which said conductive portion is inserted in the case and is free from said two coils and wherein the conductive portion of the antenna rod and the helical antennas are connectable mutually in a combined form.

10. The antenna means according to claim 9, wherein at least one of said first and said second coils has an insulated outer layer.

11. The antenna means according to claim 9, wherein a first helical antenna supply point and a second helical antenna supply point are mutually connected conductively or capacitively.

12. The antenna means according to claim 11, wherein said supply point of the first helical antenna, said supply point of said second helical antenna and said conductive portion of the antenna rod are mutually connectable conductively or capacitively/inductively in a combined form by axially moving said antenna rod.

13. The antenna means according to claim 9, wherein said second helical antenna being arranged within an upper insulating part of said antenna rod, which also includes said conductive portion and is movable coaxially within said first helical antenna, wherein said second helical antenna is located within said first helical antenna when said antenna rod is in a retracted or inserted position.

14. The antenna means according to claim 13, wherein said second helical antenna is essentially separatable electromagnetically from said first helical antenna by axially moving said antenna rod.

15. The antenna means according to claim 14, wherein a supply point of the first helical antenna, a supply point of the second helical antenna, and said conductive portion of the antenna rod are mutually connectable conductively or capacitively/inductively in a combined form by axially moving said antenna rod.

* * * * *